(12) United States Patent
Jungbecker et al.

(10) Patent No.: US 9,315,180 B2
(45) Date of Patent: Apr. 19, 2016

(54) BRAKING SYSTEM FOR MOTOR VEHICLES AND METHOD FOR OPERATING THE SAME

(75) Inventors: Johann Jungbecker, Badenheim (DE); Steffen Linkenbach, Eschborn (DE); Stefan A. Drumm, Saulheim (DE); Lothar Schiel, Hofheim (DE); Ronald Bayer, Mühlheim/Main (DE); Marco Besier, Bad Schwalbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 13/394,747

(22) PCT Filed: Sep. 7, 2010

(86) PCT No.: PCT/EP2010/063093
§ 371 (c)(1),
(2), (4) Date: Mar. 7, 2012

(87) PCT Pub. No.: WO2011/029812
PCT Pub. Date: Mar. 17, 2011

(65) Prior Publication Data
US 2012/0169112 A1    Jul. 5, 2012

(30) Foreign Application Priority Data

Sep. 11, 2009  (DE) .......................... 10 2009 029 369
Sep. 1, 2010   (DE) .......................... 10 2010 040 097

(51) Int. Cl.
*B60T 8/40* (2006.01)
(52) U.S. Cl.
CPC .................................. *B60T 8/4081* (2013.01)
(58) Field of Classification Search
CPC ..... B60T 7/042; B60T 11/228; B60T 8/3265; B60T 8/4081; B60T 8/4086

USPC .......... 303/113.4, 114.1, 115.1, 115.4, 115.2, 303/155

See application file for complete search history.

(56) References Cited

U.S. PATENT DOCUMENTS

| 3,521,934 | A | 7/1970 | Leiber |
| 4,989,925 | A | 2/1991 | Kohno |

(Continued)

FOREIGN PATENT DOCUMENTS

| DE | 40 29 793 A1 | 3/1992 |
| DE | 42 13 621 A1 | 10/1993 |

(Continued)

OTHER PUBLICATIONS

International Search Report—PCT/EP2010/063093—Nov. 18, 2010.
German Search Report—Jun. 6, 2011.

*Primary Examiner* — Bradley King
*Assistant Examiner* — Stephen Bowes
(74) *Attorney, Agent, or Firm* — Brinks Gilson & Lione

(57) ABSTRACT

A brake system for motor vehicles, which brake system can be actuated both by the vehicle driver and also independently of the vehicle driver in a "brake by wire" operating mode, is preferentially operated in the "brake by wire" operating mode, and can be operated in at least one fall-back operating mode in which only operation by the vehicle driver is possible. The brake system has inter alia an electrohydraulic pressure generating device (5) which outputs a brake system pressure, and a pressure modulation unit which has one inlet valve (6a-6d) and one outlet valve (7a-7d) per wheel brake (8, 9, 10, 11) for setting wheel-specific brake pressures derived from the brake system pressure, wherein the inlet and outlet valves (6a-6d, 7a-7d) output or transmit the brake system pressure when in the non-actuated state.

18 Claims, 1 Drawing Sheet

(56) References Cited

U.S. PATENT DOCUMENTS

| | | | |
|---|---|---|---|
| 5,609,399 A | 3/1997 | Feigel et al. | |
| 6,007,161 A | 12/1999 | Worsdorfer | |
| 6,315,370 B1* | 11/2001 | Feigel et al. | 303/115.2 |
| 6,494,547 B2* | 12/2002 | Higashimura et al. | 303/152 |
| 6,899,403 B2* | 5/2005 | Isono et al. | 303/11 |
| 7,533,944 B2* | 5/2009 | Mizutani et al. | 303/113.4 |
| 8,342,615 B2 | 1/2013 | Drumm | |
| 2002/0011750 A1 | 1/2002 | Higashimura et al. | |
| 2003/0020327 A1 | 1/2003 | Isono et al. | |
| 2007/0205659 A1* | 9/2007 | Hatano | 303/113.4 |
| 2008/0169702 A1* | 7/2008 | Ohnishi | 303/119.1 |

FOREIGN PATENT DOCUMENTS

| | | |
|---|---|---|
| DE | 195 43 582 A1 | 6/1997 |
| DE | 196 26 926 A1 | 1/1998 |
| DE | 197 53 786 A1 | 6/1999 |
| DE | 199 05 660 A1 | 5/2000 |
| DE | 10 2006 014 836 A1 | 10/2007 |
| EP | 0 265 623 A2 | 5/1988 |
| EP | WO 97/14593 | 4/1997 |
| EP | WO 98/12086 | 3/1998 |
| EP | 1 795 413 A2 | 6/2007 |
| EP | 1 950 112 A1 | 7/2008 |
| FR | 2 891 790 | 4/2007 |

* cited by examiner

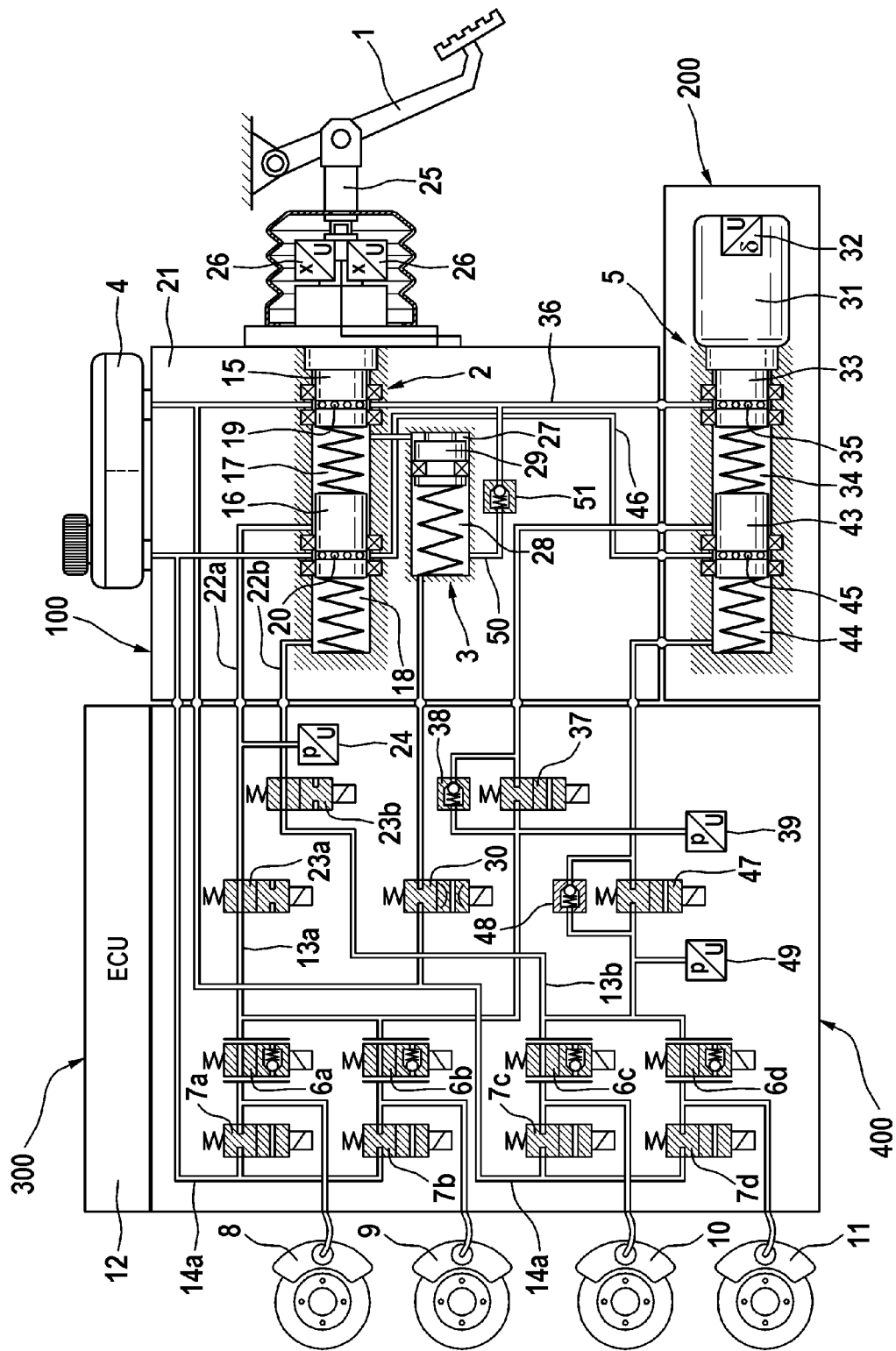

BRAKING SYSTEM FOR MOTOR VEHICLES AND METHOD FOR OPERATING THE SAME

CROSS-REFERENCE TO RELATED APPLICATIONS

This application claims priority to German Patent Application Nos. 10 2009 029 369.8, filed Sep. 11, 2009; 10 2010 040 097.1, filed Sep. 1, 2010, and PCT/EP2010/063093, filed Sep. 7, 2010.

FIELD OF THE INVENTION

The present invention relates to a brake system for motor vehicles, which brake system can be actuated both by the vehicle driver and also independently of the vehicle driver in a "brake by wire" operating mode

BACKGROUND AND SUMMARY OF THE INVENTION

The system in accordance with this invention is preferentially operated in the "brake by wire" operating mode, and can be operated in at least one fall-back operating mode in which only operation by the vehicle driver is possible, having a) a brake pedal for actuating a pedal decoupling unit having a housing, having two pistons which are arranged in series and which, in the housing, delimit two pressure chambers, which pistons are subjected to an actuating force (pedal force) when the brake system is actuated by the driver, and which pistons are positioned in an initial position by restoring springs when the brake pedal is not actuated, b) a pressure medium reservoir which is assigned to the pressure chambers and which is at atmospheric pressure, c) a travel measuring device which measures the actuating travel of the brake pedal or of a piston which is connected to the brake pedal, d) a travel simulator with a simulator enable valve which, in the "brake by wire" operating mode, imparts the familiar brake pedal feel to the vehicle driver, the travel simulator being hydraulically connected to one of the pressure chambers, and the action of which travel simulator can be deactivated in the fall-back operating mode, e) an electrohydraulic pressure generating device which outputs a brake system pressure, f) a pressure modulation unit which has one inlet valve and one outlet valve per wheel brake for setting wheel-specific brake pressures derived from the brake system pressure, wherein the inlet and outlet valves output or transmit the brake system pressure when in the non-actuated state, having cut-off valves for cutting off the pressure chambers from the pressure modulation unit, and g) an electronic control and regulating unit.

A brake system of a prior art type is known from EP 1 950 112 A1. It is considered to be a severe disadvantage of that known brake system that, in the event of a failure of the electric drive of the electrohydraulic pressure generating device during a braking process, a restoring process of the piston thereof results in a considerable lengthening of the brake pedal travel, which is perceived by the vehicle driver as a brake failure.

It is therefore an object of the present invention to improve a brake system of the type specified above such that a failure of the on-board electrical system of the motor vehicle equipped with the brake system does not lead to confusion for the vehicle driver.

The object is achieved according to the invention by means of the technical features specified herein.

BRIEF DESCRIPTION OF THE DRAWING

The present invention will be explained in more detail below on the basis of an exemplary embodiment and in conjunction with the appended schematic drawing, FIG. 1. The single FIGURE of the drawing shows a hydraulic circuit diagram of the brake system according to the invention.

DETAILED DESCRIPTION OF THE INVENTION

The brake system illustrated in the drawing is composed substantially of a hydraulic piston-cylinder arrangement 2 which can be actuated by means of an actuating or brake pedal 1, a travel simulation device 3 which interacts with the hydraulic piston-cylinder arrangement 2, a pressure medium reservoir 4 which is assigned to the hydraulic piston-cylinder arrangement 2, an electrically controllable pressure generating device 5, electrically controllable pressure modulation and inlet 6a-6d and outlet valves, 7a-7d, to the outlet ports of which are connected wheel brakes 8, 9, 10, 11 of a motor vehicle (not illustrated), and an electronic control and regulating unit 12 which serves for activating the electrically controllable components. The inlet ports of the inlet valves 6a-6d are supplied with a pressure, referred to as system pressure, via system pressure lines 13a and 13b, wherein pressure sensors 39 and 49 are provided for measuring the pressures prevailing in the system pressure lines 13a and 13b. Return lines 14a and 14b which are connected to the outlet ports of the outlet valves 7a-7d connect the outlet valves 7a-7d to the unpressurized pressure medium reservoir 4.

As can also be seen from the drawing FIG. 1, the hydraulic piston-cylinder arrangement 2, which can be regarded as an actuating unit of the brake system according to the invention, has, in a (master brake cylinder) housing 21, two hydraulic pistons 15 and 16 which are arranged in series and which delimit hydraulic chambers or pressure chambers 17 and 18 which, together with the pistons 15 and 16, form a two-circuit master brake cylinder or a tandem master cylinder. The pressure chambers 17 and 18 are connected both to the pressure medium reservoir 4 via radial bores 19 and 20 formed in the pistons 15 and 16, wherein the radial bores can be shut off by a relative movement of the pistons 17 and 18 in the housing 21, and also to the abovementioned system pressure lines 13a and 13b via hydraulic lines 22a and 22b, to which system pressure lines are connected inlet ports of the abovementioned pressure modulation or inlet valves 6a-6d. Positioned in the hydraulic lines 22a and 22b is in each case one cut-off valve 23a and 23b, the cut-off valves being designed as electrically actuable 2/2 directional control valves which are preferably open in the de-energized state. A pressure sensor 24 connected to the pressure chamber 17 measures the pressure build up in the pressure chamber 17 by a displacement of the first piston 15. Furthermore, the pressure chambers 17 and 18 accommodate restoring springs (not shown in any more detail) which preload the pistons 15 and 16 counter to the actuating direction. Here, a piston rod 25 coupled to the brake pedal 1 interacts with the first (master cylinder) piston 15, wherein the actuating travel of the brake pedal 1 is measured by a travel sensor 26 which is preferably of redundant configuration.

It is also clear from the diagrammatic illustration of the brake system according to the invention that the abovementioned travel simulator device 3 is of hydraulic design and is composed substantially of a simulator chamber 27, a simulator spring chamber 28 and a simulator piston 29 which separates the two chambers 27 and 28 from one another. Here, the simulator chamber 27 is connected to the first pressure chamber 17 of the tandem master cylinder 2, whereas the simulator spring chamber 28 is connected via an electrically actuable simulator enable valve 30 to the abovementioned return line 14b.

Finally, it can be seen in the drawing that the pressure generating device 5 is designed as a hydraulic cylinder-piston arrangement or a two-circuit electrohydraulic actuator, the first piston 33 of which can be actuated by a schematically indicated electric motor 31 via a rotation-translation gear mechanism. A merely schematically indicated rotor position sensor which serves for detecting the rotor position of the electric motor 31 is denoted by the reference numeral 32. The first piston 33 delimits a first pressure chamber 34, whereas a second piston 43 positioned downstream of the first piston 33 in the actuating direction delimits a second hydraulic pressure chamber 44. Similarly to the situation in the master brake cylinder 2 described above, the two pressure chambers 34 and 44 are firstly connected to the pressure medium reservoir 4 via radial openings 35 and 45 formed in the pistons 33 and 43 and line portions 36 and 46 which lead to the radial bores 19 and 20 of the master cylinder pistons 15 and 16, allowing for replenishment by suction from the pressure medium reservoir 4 into the pressure generating device 5, and can secondly be connected to the inlet ports of the inlet valves 6a- 6d by the opening of electrically actuable activation valves 37 and 47 which are positioned in the abovementioned system pressure lines 13a and 13b. Here, a check valve 38 and 48 which closes in the direction of the pressure chambers 34 and 44 is connected in parallel with the activation valves 37 and 47. A further line portion 50 which is connected to the line portion 36 and in which a third check valve 51 is positioned opens out in the abovementioned simulator spring chamber 28, and permits a substantially unthrottled inflow of the pressure medium into the simulator spring chamber 28 independently of the switching state of the simulator enable valve 30 and independently of a throttling action of the hydraulic simulator outflow connections.

It is optionally also possible, in order to optimize costs and installation space, for the electrohydraulic actuator 5 to be of single-circuit design; in this case the pressure chamber 44, the piston 43 and line portion 46 are dispensed with. The pressure chamber 34 is hydraulically connected to the two cut-off valves 37 and 47.

It should finally also be mentioned that the brake system illustrated in the drawing is of modular construction. Here, a first module 100 comprises substantially the master brake cylinder arrangement 2, the hydraulic travel simulator device 3, the pressure medium reservoir 4, parts of the hydraulic lines 13a, 13b, 22a, and 22b, the line portions 36, 46, and 50, and the third check valve 51. A second module 200 is formed by the electrohydraulic actuator 5, while a third module 300 is formed by the electronic control and regulating unit which is denoted in the above text by the reference numeral 12. Finally, all of the electrically actuable valves 6a-6d, 7a-7d, 23b, 30, 37, and 47, the hydraulically actuable 2/2 directional control valve 23a, the check valves 38, and 48, and all of the pressure sensors 24, 39, and 49 may be combined to form a fourth module 400, wherein all the modules 100 to 400 constitute units that can be assembled and tested independently. The mode of operation of the brake system according to the invention both in the preferred "brake by wire" operating mode and also in the so-called fall-back operating mode emerges to the expert in the relevant technical field from the content of disclosure of the present patent application, and therefore need not be explained in any more detail.

While the above description constitutes the preferred embodiment of the present invention, it will be appreciated that the invention is susceptible to modification, variation, and change without departing from the proper scope and fair meaning of the accompanying claims.

What is claimed is:

1. A brake system for motor vehicles having multiple wheel brakes, which brake system can be actuated both by a vehicle driver in a brake by wire operating mode and also independently of the vehicle driver in the brake by wire operating mode, which is normally operated in the brake by wire operating mode, and can be operated in at least one fall-back operating mode in which only actuation by the vehicle driver is possible, comprising, a brake pedal for actuating a pedal decoupling unit having a housing, with two pistons which are arranged in series and which, in the housing, delimit two pressure chambers, the pistons are subjected to an actuating force when the brake pedal is actuated by the driver, and the pistons are positioned in an initial position by restoring springs when the brake pedal is not actuated, a pressure medium reservoir which is assigned to the pressure chambers and which is at atmospheric pressure, a travel measuring device which measures the actuating travel of the brake pedal or of one of the pistons which is connected to the brake pedal, a travel simulator with a simulator enable valve which, in the brake by wire operating mode, enables a haptic brake pedal feel to the vehicle driver, the travel simulator being hydraulically connected to one of the pressure chambers, and the action of travel simulator can be deactivated in the fall-back operating mode, an electrohydraulic pressure generating device which outputs a brake system pressure, a pressure modulation unit which has an inlet valve and an outlet valve for each corresponding wheel brake of the wheel brakes of the vehicle for setting wheel-specific brake pressures derived from the brake system pressure, wherein the inlet valves transmit the brake system pressure when in a non-actuated state, wherein the wheel brakes are arranged in two brake circuits, each brake circuit includes an associated system pressure line which connects inlet ports of the inlet valves corresponding to the brake circuit to each other, cut-off valves for isolating the pressure chambers from the pressure modulation unit, and an electronic control and regulating unit, for each individual brake circuit of the two brake circuits, one electrically actuatable activation valve associated with each individual brake circuit interposed in terms of circuit layout between the pressure generating device and the pressure modulation unit, the activation valve, when in an actuated state, provides a hydraulic connection between the pressure generating device and the corresponding system pressure line;

wherein for each individual brake circuit, the one electrically actuatable activation valve associated with each individual brake circuit is the only electrically actuatable valve disposed between the pressure generating device and each of the associated system pressure lines.

2. The brake system as claimed in claim 1, further comprising in that outlet sides of the outlet valves are connected directly via hydraulic return lines to the pressure medium reservoir.

3. The brake system as claimed in claim 1, further comprising that the activation valves are closed in a de-energized state and which, in the de-energized state, prevent an outflow of pressure medium out of the pressure chambers and the wheel brakes into the electrohydraulic pressure generating device.

4. The brake system as claimed in claim 3 further comprising in that check valves are connected in parallel with the activation valves, which check valves permit a pressure medium flow from the electrohydraulic pressure generating device to the pressure modulation unit independently of the switching state of the activation valves.

5. The brake system as claimed in claim 1 further comprising that the pressure generating device is driven by an electric motor arranged on the longitudinal axis of the pressure generating device.

6. The brake system as claimed in claim 1 further comprising that the pistons which delimit the pressure chambers are formed as plunger pistons, the sealing of which is provided by means of sealing elements which are arranged fixedly with respect to the housing and which interact with the surface of the pistons.

7. The brake system as claimed in claim 1 further comprising that the pressure generating device includes a pressure generating device housing, at least one pressure generating device piston in the form of a plunger piston, which, in the pressure generating device housing, delimits at least one pressure generating device pressure chamber, and the sealing of the at least one pressure generating device piston is provided by means of sealing elements which are arranged fixedly with respect to the pressure generating device housing and which interact with the surface of the at least one pressure generating device piston.

8. The brake system as claimed in claim 7 further comprising that each of the pistons of the housing and each of the at least one pressure generating device piston of the pressure generating device are provided with a plurality of radial pressure compensation bores which, when each of the pistons of the housing and each of the at least one pressure generating device piston of the pressure generating device are in a non-actuated position, produce a hydraulic connection between the pressure chambers of the housing and the at least one pressure generating device pressure chamber of the pressure generating device housing, respectively, and the associated chambers of the pressure medium reservoir.

9. The brake system as claimed in claim 1 further comprising that the simulator enable valve is positioned in a hydraulic connection between a simulator spring chamber and the pressure medium reservoir.

10. The brake system as claimed in claim 9, further comprising that a check valve is connected in parallel with the simulator enable valve, the check valve ensures a substantially unthrottled inflow of the pressure medium into the simulator spring chamber independently of the switching state of the simulator enable valve and independently of a throttling action of hydraulic simulator outflow connections.

11. The brake system as claimed in claim 9 further comprising that the simulator spring chamber is delimited by a simulator piston in the form of a plunger piston.

12. The brake system as claimed in claim 1 further comprising that the travel measuring device is formed by a travel sensor arrangement of redundant configuration.

13. A method for operating a brake system as claimed in claim 1 further comprising that, if the pressure medium volume in the pressure generating device falls below a predetermined value, the pressure medium is replenished by suction from the pressure medium reservoir into the pressure generating device.

14. The method for operating a brake system as claimed in claim 13, further comprising that, for the replenishment by suction, the activation valves are closed and an electric motor which drives the pressure generating device is driven counter to an actuating direction.

15. The method for operating a brake system as claimed in claim 14, further comprising that, after the replenishment by suction, the electric motor which drives the pressure generating device is driven in the actuating direction.

16. The brake system as claimed in claim 1, wherein the pressure generating device includes at least one piston and at least one generator pressure chamber, and the at least one piston is actuatable by a rotation-translation gear mechanism driven by an electric motor.

17. The brake system as claimed in claim 1, wherein the simulator spring chamber is positioned in terms of circuit layout between at least one of the pressure chambers and the simulator enable valve.

18. A brake system for motor vehicles having multiple wheel brakes, which brake system can be actuated both by a vehicle driver in a brake by wire operating mode and also independently of the vehicle driver in the brake by wire operating mode, which is normally operated in the brake by wire operating mode, and can be operated in at least one fall-back operating mode in which only actuation by the vehicle driver is possible, comprising,
 a brake pedal for actuating a pedal decoupling unit having a housing, with two pistons which are arranged in series and which, in the housing, delimit two pressure chambers, the pistons are subjected to an actuating force when the brake pedal is actuated by the driver, and the pistons are positioned in an initial position by restoring springs when the brake pedal is not actuated,
 a pressure medium reservoir which is assigned to the pressure chambers and which is at atmospheric pressure,
 a travel measuring device which measures the actuating travel of the brake pedal or of one of the pistons which is connected to the brake pedal,
 a travel simulator with a simulator enable valve which, in the brake by wire operating mode, enables a haptic brake pedal feel to the vehicle driver, the travel simulator being hydraulically connected to one of the pressure chambers, and the action of travel simulator can be deactivated in the fall-back operating mode,
 an electrohydraulic pressure generating device which outputs a brake system pressure,
 a pressure modulation unit which has an inlet valve and an outlet valve for each corresponding wheel brake of the wheel brakes of the vehicle for setting wheel-specific brake pressures derived from the brake system pressure, wherein the inlet valves transmit the brake system pressure when in a non-actuated state,
 wherein the wheel brakes are arranged in at least a first circuit and a second circuit, the first circuit having two associated inlet valves being connected to each other via a first system pressure line, and the second circuit having two associated inlet valves being connected to each other via a second system pressure line;
 cut-off valves for isolating the pressure chambers from the pressure modulation unit, and
 an electronic control and regulating unit,
 a first electrically actuatable activation valve for the first brake circuit, the first electrically actuatable activation valve being interposed in terms of circuit layout between the pressure generating device and the pressure modulation unit, the first activation valve, when in an actuated state, providing a hydraulic connection between the pressure generating device and the first system pressure line;

a second electrically actuatable activation valve for the second brake circuit, the second electrically actuatable activation valve being interposed in terms of circuit layout between the pressure generating device and the pressure modulation unit, the second activation valve, when in an actuated state, providing a hydraulic connection between the pressure generating device and the second system pressure line;

wherein the first electrically actuatable valve is the only valve disposed between the pressure generating device and the first system pressure line and the second electrically actuatable valve is the only valve disposed between the pressure generating device and the second system pressure line.

* * * * *